United States Patent [19]
Teran

[11] Patent Number: 5,512,015
[45] Date of Patent: Apr. 30, 1996

[54] MEAT TENDERIZATION PROCESS FOR A MICROWAVABLE MEAT PRODUCT

[76] Inventor: James Teran, 932 E. Thames St., Highlands Ranch, Colo. 80126

[21] Appl. No.: 471,167

[22] Filed: Jun. 6, 1995

[51] Int. Cl.⁶ .................................................. A22C 9/00
[52] U.S. Cl. .............................. 452/141; 426/56; 426/63
[58] Field of Search .................................. 452/141, 142, 452/144; 426/56, 241, 72, 63; 99/451

[56] References Cited

U.S. PATENT DOCUMENTS

| | | |
|---|---|---|
| 2,140,781 | 12/1938 | Allen . |
| 2,321,623 | 6/1943 | Ramsbottom et al. . |
| 2,471,282 | 5/1949 | Paddock . |
| 2,999,020 | 9/1961 | Williams . |
| 3,147,123 | 9/1964 | Komarick . |
| 3,166,423 | 1/1965 | Sleeth et al. . |
| 3,188,213 | 6/1965 | Delaney . |
| 3,533,803 | 10/1970 | Schack et al. . |
| 3,798,334 | 3/1974 | Glenview et al. . |
| 4,066,790 | 1/1978 | Connick et al. . |
| 4,313,963 | 2/1982 | Greenspan . |
| 4,539,210 | 9/1985 | O'Connell et al. . |

Primary Examiner—Willis Little
Attorney, Agent, or Firm—Tom Hamill, Jr.

[57] ABSTRACT

A meat tenderization process for a microwavable meat product is disclosed. The multi-step process takes whole primals, specifically of canner and cutter grade, and prepares them with a solution including proteolytic enzymes. The proteolytic enzymes include a mixture of bromelin, ficin and papain. The first step of the process is to inject the primals with the proteolytic enzyme and flavor solution. The second step includes the tumbling of the primal for a period of time at a certain pressure and rpm. The third step includes the vacuum bagging of the primal at certain pressures, during this step the primal assumes an elongated cylindrical shape with a diameter. The fourth step is placing the bagged primal in a heated environment at a specific temperature range for a specific time period range. The fifth step is rapidly cooling the bagged primal to a specific temperature within a certain time period. The sixth step is the final cooling step, cooling the primal to a final temperature. At this point the primal is cut and packaged for the consumer. The last step of the process occurs when the consumer microwaves the product, where one of the proteolytic enzymes is activated. The final "steak" product is of good flavor and texture, without the toughness and poor texture of an untreated microwaved "steak". The instant invention is designed to produce a meat product specifically to be heated/cooked in a microwave oven.

13 Claims, 1 Drawing Sheet

MEAT TENDERIZATION PROCESS FOR A MICROWAVABLE MEAT PRODUCT

BACKGROUND OF THE INVENTION

1. Field of the Invention

The present invention relates generally to a meat tenderization process, and more particularly, to a meat tenderization process especially adapted to effect the tenderization of canner and cutter grade primal meats which are to be prepared by the consumer in a microwave oven.

2. Description of the Prior Art

Microwave ovens have had a significant impact on eating habits during the last several decades. One drawback of the microwave oven is its inability to prepare a "steak" style cut of meat with the tenderness, texture and flavor of a conventional oven or broiler. It has long been known in the meat preparation art to effect the tenderization of meat by the effect of proteolytic enzymes such as ficin, bromelin, and papain. The instant invention utilizes these enzymes in a novel fashion, utilizing enzyme activation/deactivation in such a fashion to produce a "steak" cut, specifically to be heated/cooked in a microwave oven, which produces a final product which is of good flavor, texture and tender. This will enable the consumer to prepare such a cut of meat conveniently in the microwave oven.

It has been known to utilize proteolytic enzymes in meat tenderization. U.S. Pat. No. 3,533,803 issued to Connick et al. discloses a process for the preparation of meat which utilizes the aforementioned enzymes. The method is designed to be employed during a canning process, where the meats are canned for a product such as a cooked meat product. The process discloses the enzymes being introduced into the product, allowed to disperse into the product, then the product is cut into small pieces, and selective enzyme activation and deactivation takes place.

Thus, while the foregoing body of prior art indicates it to be well known to use the combination of the proteolytic enzymes ficin, bromelin and papain in combination to effect the tenderization of meat the provision of employing the three enzymes in such a fashion as to permit the papain to be activated in a microwave oven while microwaving the "steak" style cut is not contemplated. Nor does the prior art described above teach or suggest a means to prepare a tough grade of meat through the instant novel process as will be further described below, which may be used by meat preparation facilities to bring a "steak" to the consumer which may be microwaved in a microwave oven while retaining its natural flavor and an excellent appetizing texture. The foregoing disadvantages are overcome by the unique method of preparing and processing the whole primal with proteolytic enzymes by the method of the present invention as will be made apparent from the following description thereof. Other advantages of the present invention over the prior art also will be rendered evident.

SUMMARY OF THE INVENTION

It is proposed in the instant invention to use a canner or cutter grade of meat, and prepare a "steak" style cut of meat, ready to heat in the microwave, that will be tender, of the correct texture and of an appetizing flavor. The canner and cutter grades of meat have historically been directed to hamburger or beef jerky. These tough grades of meat have been not be able to be utilized in the "steak" style and certainly would be inedible if microwaved without employing the novel meat tenderization process of the instant invention.

To achieve the foregoing and other advantages, the present invention, briefly described, provides a meat tenderization process for a microwavable meat product. The multi-step process takes whole primals, specifically of canner and cutter grade, and prepares them with a solution including proteolytic enzymes. The proteolytic enzymes include a mixture of bromelin, ficin and papain. The first step of the process is to inject the primals with the proteolytic enzyme and flavor solution. The second step includes the tumbling of the primal for a period of time at a certain pressure and rpm. The third step includes the vacuum bagging of the primal at certain pressures, during this step the primal assumes an elongated cylindrical shape with a diameter. The fourth step is placing the bagged primal in a heated environment at a specific temperature range for a specific time period range. The fifth step is rapidly cooling the bagged primal to a specific temperature within a certain time period. The sixth step is the final cooling step, cooling the primal to a final temperature. At this point the primal is cut and packaged for the consumer. The last step of the process occurs when the consumer microwaves the product, where one of the proteolytic enzymes is activated. The final "steak" product is of good flavor and texture, without the toughness and poor texture of an untreated microwaved "steak".

The invention will provide a meat product for microwaving by the consumer. This meat product will be a "steak" cut, which would be generally inedible (certainly not easily or desirably edible) if not prepared according to the instant process. The process relies on the use of three enzymes, ficin, bromelin and papain and their inherent temperature dependent enzymatic activation and deactivation states. The instant invention will take advantage of the fact that the microwave will activate the enzymatic tenderization action of the papain during the microwaving process. The papain, by its action, will counteract the deleritious effects of microwaving such a meat product.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved meat tenderization process for a microwavable meat product which will permit a tough canner or cutter grade of meat to be consumed by a human consumer in a "steak" cut form, as well as to prepare a meat product specifically designed to be heated/cooked in a microwave oven.

It is another object of the present invention to provide a new an improved meat tenderization process for a microwavable meat product which utilizes a plurality of proteolytic enzymes, including a mixture of bromelin, papain and ficin.

It is a further objective of the present invention to provide a new and improved meat tenderization process for a microwavable meat product which selectively activates and deactivates the bromelin and ficin at the processing plant, and further permits the activation and deactivation of the papain at the consumers home, during the microwave preparation of the meat product.

An even further object of the present invention is to provide a new and improved meat tenderization process for a microwavable meat product which is susceptible of a low cost with regard to both materials and labor, and which accordingly will permit such a meat product produced by such a process to be sold to the consuming public.

Still yet a further object of the present invention is to provide a new and improved meat tenderization process for a microwavable meat product which employs an enzyme injection step, a tumbling step, a vacuum bagging step, a heating step, a rapid cooling step and a microwaving step.

It is still a further object of the present invention is to provide a new and improved meat tenderization process for a microwavable meat product which produces a product designed to be heated/cooked in the microwave oven, which further avoids all the current drawbacks of cooking/heating meat in the microwave. Such drawbacks include poor texture, flavor and toughness.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
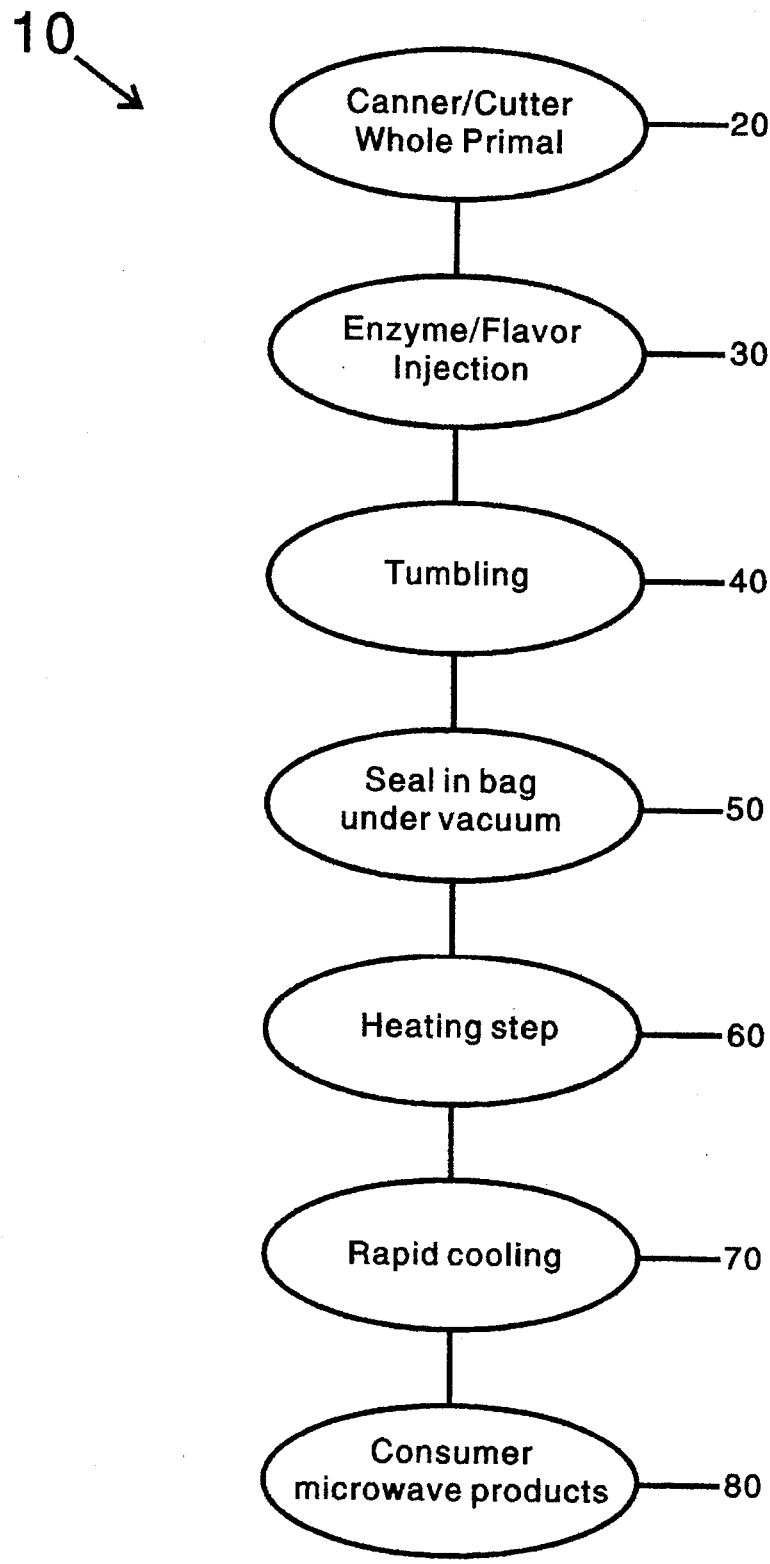
FIG. 1 is a block diagram showing the process steps involved in the meat tenderization process for a microwavable meat product of the instant invention.

With reference now to the drawings, a new and improved meat tenderization process for a microwavable meat product embodying the principles and concepts of the present invention will be described.

Turning to FIGS. 1, there is shown the exemplary embodiment of the meat tenderization process for a microwavable meat product of the invention generally designated by reference numeral 10. In its preferred form, the meat tenderization process for a microwavable meat product 10 comprises generally 7 steps which will be described in detail below.

Referring to the first step, the whole primals of canner or cutter grade 20 are mechanically injected with a flavor and proteolytic enzyme solution. The injection step 30 may be made by any injection means known in the meat industry. The flavoring solution component includes water, sodium lactate, salt, sodium phosphate, beef flavor (maltdextrin, salt, natural flavor, yeast extract), dried beef stock, disodium inosinate, disodium guanylate, as well as flavorings, which are critical to inhibiting bacterial growth. These bacterial inhibitants will permit the final product to have an enhanced fresh refrigerated shelf life of 70 days. The proteolytic enzyme solution includes ficin, bromelin, and papain at about 0.45% by weight. The whole primals are then brought to the second step of the tenderization process, the tumbling step 40.

The second step of the meat tenderization process is the tumbling step 40. The primal meat is placed in a finned vacuum tumbler. This tumbler has a central sealable chamber, with finned elements located therein. The central sealable chamber may be evacuated to specific pressures. The central chamber is rotatable by a motor, and through a control mechanism the revolutions per minute, as well as the specific pressure, may be set. In the preferred embodiment of the process the whole primal will be rotated in the tumbler at about 13 revolution per minute for about 20 minutes. The vacuum will be established at about 22 pounds per square inch or greater. The optimum and preferred pressure will be minus 22 pounds per square inch, as this is a vacuum. These values of negative pressure, time and rotation guarantees equal distribution of the solution mixture throughout the primal meat. The negative pressure or vacuum pulls the muscle fibers of the whole primal meat apart, allowing for a more rapid and uniform distribution of the solution. The pressure is chosen as to not shred or tear apart permanently the whole primal muscle fibers, just to displace them while retaining structural cohesiveness. After the tumbling is complete, the whole primals are brought to the third step of the tenderization process, the vacuum bagging step 50.

The third step of the meat tenderization process is the vacuum bagging step 50. The whole primal piece is placed in an individual closed environment, such as a polymer bag. This polymer bag is sealable, and is chosen of a material which will facilitate heat transfer. The polymer bag is a cooking bag, which will permit the meat to be cooked without loss of the aforementioned solutions of enzymes and flavors, as well as the naturally occurring fluids which generate as a result of cooking. The thickness of the bag is chosen to be sufficient to prevent ease of puncturing and a vacuum maintenance, yet thin enough to permit effective heat transfer. Once the primal is placed in the polymer bag, the bag is evacuated by a vacuum means to approx. 22 pounds per square inch of vacuum. At this point the polymer bag is sealed by an appropriate sealing means which permits the bag to retain its vacuum. Through the action of the vacuum and by the design of the polymer bag, the whole primal assumes a generally elongated cylindrical shape. The approx. diameter of the cylinder is about 5 to 6 inches. The preferred diameter is between 5 and 6 inches. The core of the elongated cylindrical shape is centrally located along the centerline of the cylinder. The whole primal is then transported by any means to the fourth step in the process which is the heating or cooking step 60.

The fourth step of the meat tenderization process is the heating or cooking step 60. During this step, specific temperatures must be maintained for certain time intervals to activate and deactivate the enzymes which tenderize the whole primal. The whole primal is placed in a controlled temperature environment, such as an oven, hot water bath etc., which can be maintained at about 175 degrees fahrenheit. The preferred temperature is 175 degrees fahrenheit. The total cooking time will be approximately 4 hours which permits the core of the generally cylindrically shaped whole primal to reach 145 degrees fahrenheit. The enzymes present are a mixture of bromelin, ficin and papain. The bromelin and ficin are activated at 90 degrees fahrenheit, that is, the meat tenderization properties of these two enzymes begin to tenderize the meat at this temperature. The bromelin tenderization action ceases at 140 degrees fahrenheit, that is, the meat tenderization property of bromelin ceases at this temperature. The ficin tenderization action ceases at 145 degrees fahrenheit. The bromelin and ficin, once activated and brought through their upper temperature deactivation state, are permanently deactivated and no longer possess a capacity to tenderize. At this point in the process, the enzymatic action of the enzymes ficin and bromelin ceases permanently.

The enzyme papain has a higher enzymatic activation temperature in the range of 140 to 145 degrees fahrenheit. Once the core temperature becomes 145 degrees fahrenheit, the papain enzymatic action will only be maintained for about 15 minutes. The preferred time period is less than 15 minutes. After the approx. 15 minute time interval has been met, the whole primal is brought by any means to the sixth step in the meat tenderization process, the rapid cooling step 70.

At this point the whole primal must be put through the sixth step of the meat tenderization process, the rapid cooling step 70, by an ice bath, blast freezer or other suitable means, to bring the core temperature down to about 139 degrees fahrenheit or less within about 50 minutes. The preferred temperature is 139 degrees fahrenheit. The rapid cooling step deactivates the enzymatic action of the papain, yet leaves about 90% of the enzymatic action of the papain available for use. This 90% of unactivated papain will be reactivated during the microwave step. As will be further discussed during the discussion of the microwave step, the papain will reactive during the microwave step, counteracting the deleterious effect of microwaving on the final product. The chilling of the whole primals continues until the temperature is 40 degrees fahrenheit or lower throughout the product. At this point the meat product is available for cutting or packaging. It will be prepared/packaged in a suitable manner consistent with the requirements of consumer sales and transport. By utilizing bacterial growth inhibitants in the process it is anticipated that the meat product will have an enhanced fresh refrigerated shelf life of 70 days. The meat product is transported to a food store where it is purchased by the consumer. The packaging includes complete preparation instructions, noting that this product is designed to be heated/cooked in a microwave oven. At some point the consumer brings the meat product to the seventh step in the process, the consumer microwave step 80.

The seventh step in the meat tenderization process is the consumer microwave step 80. The consumer follows specific instructions located on the product packaging in order to obtain the desired end product. Since the steak product is pre-cooked to a medium rare state prior to its packaging, the end user (consumer) may heat the product in the microwave and serve. The microwave reactivates the papain, which prevents all the adverse effects of the microwave oven on the product. The steak product produced is of good flavor, tenderness and texture.

It is apparent from the above that the present invention accomplishes all of the objectives set forth by providing a new and improved meat tenderization process for a microwavable meat product which will permit a tough canner or cutter grade of meat to be consumed by a human consumer in a "steak" cut form, as well as to prepare a meat product specifically designed to be heated/cooked in a microwave oven, which utilizes a plurality of proteolytic enzymes, including a mixture of bromelin, papain and ficin.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved meat tenderization process for tenderizing a meat product at the processing plant and finally in a microwave oven comprising the steps of:

a) providing a whole primal, b) introducing a mixture of papain, bromelin and ficin enzymes and flavoring to the whole primal, c) tumbling the whole primal in a tumbler, said tumbling step to take place under a first pressure, d) placing and sealing the whole primal in a polymer bag, e) heating the whole primal at a first temperature, for a first time period, which activates the bromelin and ficin, causing tenderization to take place, d) rapidly cooling the primal at a second temperature, for a second time period, which deactivates the bromelin and ficin, e) packaging and transporting the product to a consumer, f) microwaving the product, whereby the papain is activated by the microwave heating, causing the product to be of good flavor, texture and appearance.

2. The meat tenderization process as claimed in claim 1 wherein said first pressure is about minus 22 pounds per square inch (vacuum).

3. The meat tenderization process as claimed in claim 2 wherein said mixture is introduced by a mechanical injection.

4. The meat tenderization process as claimed in claim 3 wherein said first temperature is about 175 degrees fahrenheit, and said first time period is about 4 hours.

5. The meat tenderization process as claimed in claim 4 wherein said second time period is 50 minutes.

6. The meat tenderization process as claimed in claim 5 wherein said second temperature is below 32 degrees fahrenheit.

7. The meat tenderization process as claimed in claim 6 wherein said whole primal is sealed in said polymer bag at a second pressure, said second pressure being about minus 22 pounds per square inch (vacuum).

8. The meat tenderization process as claimed in claim 7 wherein said whole primal is selected from the cutter grade of meat.

9. The meat tenderization process as claimed in claim 7 wherein said whole primal is selected from the canner grade of meat.

10. The meat tenderization process as claimed in claim 6 wherein said tumbling step takes place for about 20 minutes, the tumbler further rotating at about 13 revolutions per minute.

11. The meat tenderization process as claimed in claim 10 wherein said product is further packaged as a "steak cut".

12. The meat tenderization process as claimed in claim 11 wherein said flavoring includes water, sodium lactate, salt, sodium phosphate, beef flavor, dried beef stock, disodium inosinate, disodium guanylate.

13. The meat tenderization process of claim 12 wherein said flavoring further includes an antibacterial growth means.

* * * * *